US008893550B2

(12) United States Patent  
Wu

(10) Patent No.: US 8,893,550 B2  
(45) Date of Patent: Nov. 25, 2014

(54) NON-INVASIVE VIBRO-ACOUSTIC ANALYSIS

(75) Inventor: Sean F. Wu, Troy, MI (US)

(73) Assignee: Wayne State University, Detroit, MI (US)

( * ) Notice: Subject to any disclaimer, the term of this patent is extended or adjusted under 35 U.S.C. 154(b) by 2274 days.

(21) Appl. No.: 11/564,945

(22) Filed: Nov. 30, 2006

(65) Prior Publication Data

US 2007/0163351 A1 Jul. 19, 2007

Related U.S. Application Data

(60) Provisional application No. 60/741,915, filed on Dec. 2, 2005.

(51) Int. Cl.
*G01H 11/00* (2006.01)
*G01H 1/00* (2006.01)
*G01H 17/00* (2006.01)
*G01H 3/00* (2006.01)

(52) U.S. Cl.
CPC ............ *G01H 1/003* (2013.01); *G01H 17/00* (2013.01); *G01H 3/00* (2013.01)
USPC .......................................................... 73/649

(58) Field of Classification Search
USPC .......................................................... 73/649
See application file for complete search history.

(56) References Cited

U.S. PATENT DOCUMENTS

2005/0150299 A1* 7/2005 Wu ................................ 73/587

OTHER PUBLICATIONS

Hans-Elias de Breem W.F. Druyvesteyn, E. Berenschot, M. Elwenspoek; Three-Dimensional Sound Intensity Measurements Using Microflown Particle Velocity Sensors; 1999; IEEE.*
International Preliminary Report on Patentability for PCT Application No. PCT/US2006/045865, Jun. 12, 2008.

* cited by examiner

*Primary Examiner* — Hezron E Williams
*Assistant Examiner* — George J Redmann
(74) *Attorney, Agent, or Firm* — Carlson, Gaskey & Olds P.C.

(57) ABSTRACT

A system provides an in situ or non-invasive vibro-acoustic (VA) analysis of an arbitrary complex vibrating structure. The noise diagnostic system includes a plurality of first transducers for measuring acoustic pressure in a sound field near a noise source. At least one second transducer measures normal surface velocity on the noise source. A computer acquires acoustic pressure data from the plurality of first transducers and normal surface velocity data from the at least one second transducer. The computer generates a transfer matrix representing a correlation between normal surface velocity on the noise source and the acoustic pressure in the sound field.

17 Claims, 1 Drawing Sheet

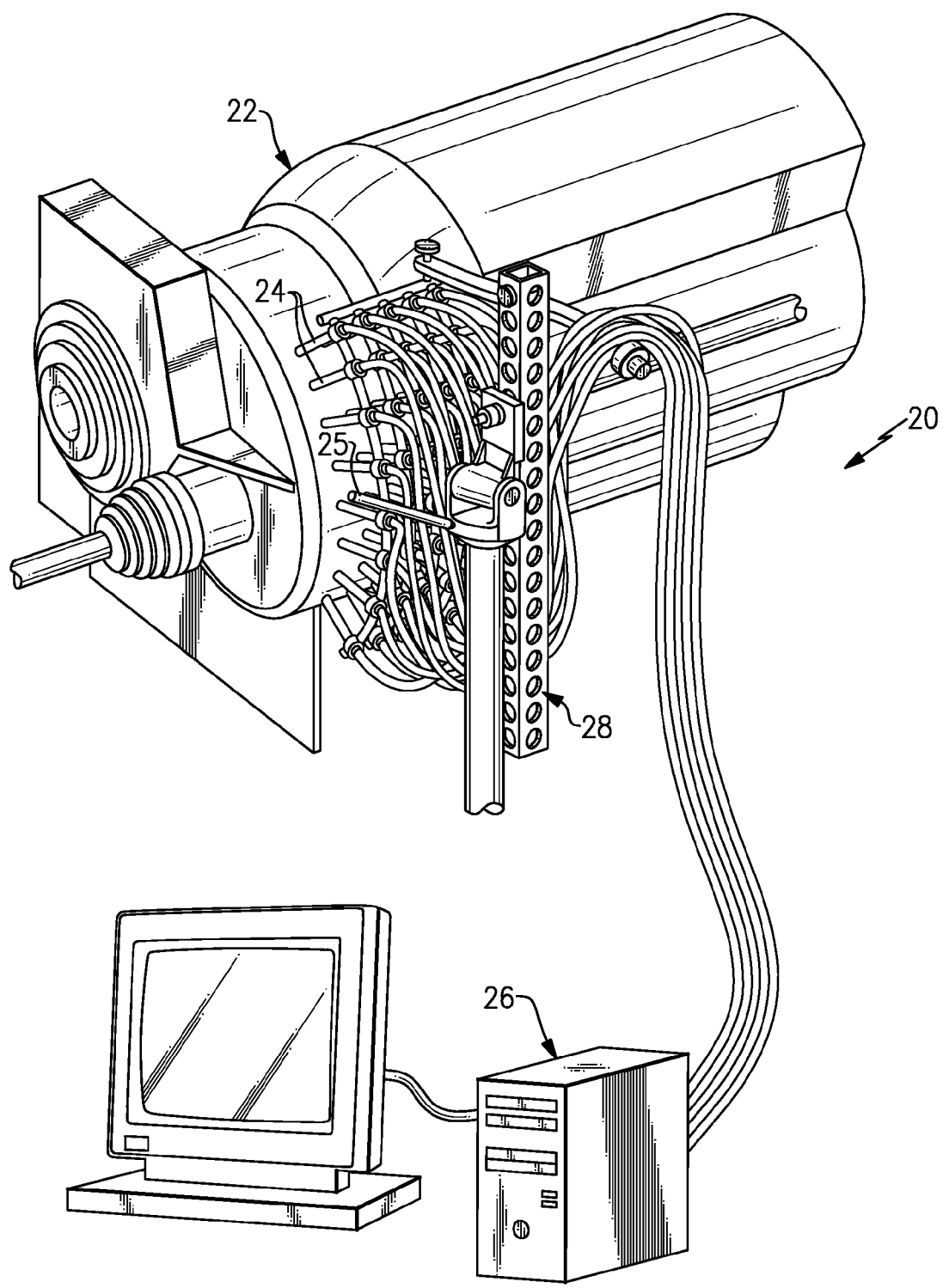

NON-INVASIVE VIBRO-ACOUSTIC ANALYSIS

This application claims priority to U.S. Provisional Application Ser. No. 60/741,915, filed on Dec. 2, 2005.

BACKGROUND OF INVENTION

The present invention relates to a method and system for an in situ or non-invasive vibro-acoustic (VA) analysis of an arbitrary machine.

Currently, structural vibration analysis is primarily done by using modal analysis, which is used to identify the natural frequencies, natural modes and damping ratios of a system. With this information, engineers may be able to suppress structural vibrations and improve the performance of a machine. Such a technique has been employed by vibration engineers for many years and has been documented extensively in the literature.

Traditional vibration modal analysis is suitable for simple structures with simple boundary conditions subject to simple excitations; however, there are many inherent difficulties in this approach. For example, it cannot handle cases in which modal overlapping occurs, namely, many natural modes occur at the same frequency. It does not allow for an in situ or non-invasive vibration analysis of a machine running under its natural working condition. Oftentimes, one has to stop a machine, detach it from its original mounting unit, and place it in a special test set up. If a machine is too complicated, one has to disassemble it to facilitate modal analyses on individual components. Thus, instead of analyzing overall vibration behavior of a machine as a whole under its original operating condition, one must study individual components under entirely differently boundary conditions subject to different excitations. The reason for that is because modal analysis relies on measurements of transfer functions (TF) between an excitation force and responses. When a machine runs on its own, for example, a fired engine, there is no way to measure the excitation (combustion) forces that occur inside the cylinders of this engine. Most importantly, traditional modal analysis is for structural vibration only. It has nothing to do with sound radiation into the surrounding medium. Therefore, results cannot be used to guide design modification to suppress sound.

SUMMARY OF INVENTION

The method and system of present invention overcome the difficulties inherent in traditional modal analysis. In particular, it enables one to conduct a non-invasive VA analysis. There is no need to stop a machine, isolate it from its original setup, and disassemble it to pieces. Engineers will be able to conduct a non-invasive VA analysis of any machine running under its natural operating condition. The input data can be measured using hardware such as a scanning laser vibrometer to acquire the normal surface velocity responses, or accelerometers that are mounted on a vibrating surface if it is so chosen by an operator. These surface velocities are supplemented by the sound pressure measured using an array of microphones stationed at very close range to a machine to capture the near-field effects that are critical in reconstructing vibration responses on the surface of a source. Note that the vibration and sound pressure measurements are all standard procedures in practice. The key to the present method and system is the algorithms that process the input data and produce a good understanding of the sound generation mechanisms, and provide insight into design modifications of a machine to suppress sound and vibrations in the most cost-effective manner.

Like modal analysis, the method and system of present invention decomposes complex vibration responses into linearly independent and mutually orthogonal basis functions, which are called the VA modes. Although a VA mode may look similar to a natural mode of a structure, they are actually quite different. The natural mode of a structure is determined by its boundary conditions and dimensions. Each natural mode has a natural frequency associated with it. Depending on the boundary conditions, dimensions and geometry of a structure, different natural modes may share the same natural frequency, known as modal overlapping. When modal overlapping occurs, it will not be possible for modal analysis to separate individual modes and therefore, not be able to provide any useful insight into structural vibrations.

Unlike modal analysis, all VA modes share the same frequency, and the analyses of VA modes are done for a particular frequency at a time. Hence, there is no modal overlapping. Moreover, each VA mode is directly correlated to resultant sound radiation, and the efficiency of each individual VA mode with respect to the overall sound radiation and structural vibration can be calculated explicitly. With this knowledge, it is possible to target certain VA modes that may be the major contributors to sound radiation and structural vibration, making noise and vibration abatement most cost effective.

The major advantages of the present invention are to: (1) identify the VA modes that correlate structural vibration to sound radiation; (2) quantify the relative contributions from individual VA modes to overall structural vibration and sound radiation; and (3) allow an in situ analysis of the root causes of sound and vibration of a machine running under its natural working condition.

Note that the particle velocities in the air can be taken as input data to the method and system of the present invention as well. These input data can be further supplemented by the measurements of sound pressure signals if it is so desired. The combined data can provide more accurate descriptions of the structural vibration and sound field, which in turn can lead to more detailed analyses of sound and vibration and helpful insight for sound and vibration abatements. The devices for measuring the particle velocity and sound pressure include the P-U probes by Microwflow that are available in the market.

The reason for acquiring both velocity and sound pressure information is because vibro-acoustic analysis is an inverse problem. Mathematically, all inverse problems are ill posed. Namely, there is no unique correspondence between a cause and an effect, and solutions may not be unique or not be convergent. The reason for this ill-posedness in an inverse problem is that the input data are usually incomplete and/or inaccurate. Thus by collecting both particle velocity and sound pressure, the problem may become better posed and its solution may become convergent.

It is emphasized that the method and system described herein is different from so-called operational modal analysis (OMA). OMA is an extension of traditional modal analysis and applicable when the excitation force is purely random, for example, a bridge excited by a gust of wind. Under this condition, there is no need to determine an excitation force. All one needs is to measure the structural vibration responses or frequency response function (FRF) curves, which have the same shape as that of TF since excitation is completely random (i.e., frequency white). In practice, however, most structures are excited by a time-harmonic function, i.e., a sinusoidal function or a combination of sinusoidal functions. For example, an engine running at a constant speed will excite structures into harmonic vibrations. Under this condition OMA will be useless because the FRF curves will be totally different from that of TF. Like modal analysis, OMA will not be able to provide any insight whatsoever on resultant sound radiation.

The method and system described below will provide an innovative approach to gain an insight into the most cost-effective way of noise and vibration abatement for an arbitrary machine. This approach is based on a special transfer matrix that correlates structural vibrations with resultant sound radiation.

Input data to the transfer matrix can be collected in any of the following manners: 1) the normal surface velocity measured by a non-invasive scanning laser vibrometer and sound pressures measured by an array of microphones that are positioned at very close range to a target structure; 2) the normal surface velocity measured by accelerometers mounted on the surface and sound pressures measured by an array of microphones that are positioned at very close range to a target structure; and 3) the particle velocity and sound pressure measured by a non-invasive P-U probe scanning over a target structure at close distances. The first and third approaches represent a truly non-invasive VA analysis, whereas the second approach is in contact with a structure. On the other hand, the second approach is most commonly used to obtain surface vibration response in practice.

Next, a mathematical tool such as singular value decomposition (SVD) is utilized to decompose the transfer matrix into a set of the forced VA modes. There are different ways to decompose a matrix and SVD is only one of them. Since the VA modes are linearly independent and mutually orthogonal, one may superimpose them to obtain a unique and convergent solution of any structural vibration response.

Finally, the sound radiation and structural vibration efficiencies for individual VA modes are calculated. The knowledge gained can be used in design modifications focusing on the specific VA modes that are major contributors to sound radiation and structural vibrations. Note that suppressing specific VA modes are always much more cost effective in noise and vibration abatement than suppressing the overall sound and vibration of a machine.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 illustrates one embodiment of a forced VA analysis system according to the present invention.

DETAILED DESCRIPTION OF A PREFERRED EMBODIMENT

An example of a noise diagnostic system 20 performing forced VA analysis according to one embodiment of the present invention is shown in FIG. 1, in which the sound pressures from a source 22, in this case a transaxle, are measured. Measurements of the normal surface velocity responses are taken using a scanning laser 25. The system 20 generally comprises a plurality of transducers 24, such as microphones, connected to computer 26. The computer 26 may include additional hardware such as a signal analyzer or a digital sound processing computer board (not shown). The computer 26 has a processor operating computer programs stored on computer storage media, which may be one or more RAM, ROM, hard-drive, CD-ROM, DVD, optical, electronic or magnetic media, or any other computer-readable medium. The computer media stores computer programs, which when executed by processor performs the steps described below, including performance of algorithms of the present invention described below.

In FIG. 1, each of the transducers 24 are mounted to a frame 28 covering a portion of the noise source 22 (one frame 28 is shown in FIG. 1, but more could be used). In this example there are fifty-four transducers 22 mounted on the frame 28, but more or fewer can be deployed. In general, the more transducers 24 are used, the higher the accuracy of the reconstructed sound pressure and normal surface velocity is. The present method and system has no restrictions whatsoever on number of transducers 24 used in implementation. The transducers 24 are directed toward the noise source 22 and may be spaced uniformly or non-uniformly along the circumference of the frame 28. The frame 28 can be in any shape (a planar shape is the most convenient in practice, but the one that conforms to the contour of a target structure surface will produce the most accurate results).

In operation, the amplitude and frequency of the normal surface velocities can be measured by a non-invasive laser vibrometer 25 or P-U probe, or by accelerometers mounted on the surface directly. The amplitude and frequency of the sound pressure can be measured by an array of microphones (transducers 24). The gathered data are sent to the computer 26, which uses the methods more fully explained below to analyze the mechanisms of structural vibration and sound generation of the source 22 so as to yield the best noise and vibration abatement designs.

The underlying principle is to express a correlation between the normal surface vibration responses on a target source 22 and the input data measured by transducers 24 in as $$\{v_n(\vec{x}_S;\omega)\}_{N\times 1} = \left[\frac{\partial \Psi(\vec{x}_S;\omega)}{\partial n}\right]_{N\times M} \{\text{Input Data}\}_{M\times 1}, \quad (1)$$

where the column vector $\{\text{Input Data}\}_{M\times 1}$ on the right side of Eq. (1) contains the normal surface velocity $v_n(\vec{x}_\mu;\omega)$ measured at $m_1$ points $\vec{x}_\mu$ on a source surface by any velocity measurement device (the subscript n indicates the normal component of the velocity), plus sound pressure $p(\vec{x}_\nu;\omega)$ measured at $m_2$ points $\vec{x}_\nu$ by any sound pressure measurement devices.

$$\{\text{Input Data}\}_{M\times 1} = \left\{ \begin{array}{c} \left\{\left(\frac{\partial \Psi^H(\vec{x}_\mu;\omega)}{\partial n}\right)^\dagger v_n(\vec{x}_\mu;\omega)\right\}_{m_1\times 1} \\ \left\{\Psi^H(\vec{x}_\nu;\omega)^\dagger p(\vec{x}_\nu;\omega)\right\}_{m_2\times 1} \end{array} \right\}_{M\times 1}, \quad (2)$$

where $$\frac{\partial \Psi^H(\vec{x}_\mu;\omega)^\dagger}{\partial n}$$

and $\Psi^H(\vec{x}_\nu;\omega)^\dagger$ represent the pseudo inversions defined as $$\frac{\partial \Psi^H(\vec{x}_\mu;\omega)^\dagger}{\partial n} = \left[\frac{\partial \Psi^H(\vec{x}_\mu;\omega)}{\partial n}\frac{\partial \Psi(\vec{x}_\mu;\omega)}{\partial n}\right]^{-1} \frac{\partial \Psi^H(\vec{x}_\mu;\omega)}{\partial n}, \quad (3a)$$

$$\Psi^H(\vec{x}_\nu;\omega)^\dagger = \left[\Psi^H(\vec{x}_\nu;\omega)\Psi(\vec{x}_\nu;\omega)\right]^{-1} \Psi^H(\vec{x}_\nu;\omega), \quad (3b)$$

where a superscript H implies a hermitian transposition and the elements of $\Psi$ are given by $$\Psi_j^{(1)} \equiv \Psi_{ql}^{(1)}(r,\theta,\phi;\omega) = h_q^{(1)}(kr)Y_q^l(\theta,\phi), \quad (3c)$$

where $h_q^{(1)}(kr)$ implies the spherical Hankel functions of order q of the first kind, k is the acoustic wavenumber, $Y_q^l(\theta,\phi)$ are the spherical harmonics, the indices j, q, and l in (3) are related via $j=q^2+q+l+1$ with q starting from 0 to Q and l varying from $-q$ to q.

Referring to Equation (1), the total number of measurement points $M=m_1+m_2$, and the number of reconstruction points N on a source surface is different from $m_1$ and is much larger than $m_1$. The spherical Hankel functions $h_q^{(1)}(kr)$, spherical harmonics $Y_q^l(\theta,\phi)$, the input data $v_n(\vec{x}_\mu;\omega)$ and $p(\vec{x}_\nu;\omega)$ and their locations are specified, and the normal surface velocities $v_n(\vec{x}_S;\omega)$ at N locations are to be reconstructed. Therefore, Eq. (1) correlates the measured data to the desired normal velocities $v_n(\vec{x}_S;\omega)$ at any N locations $\vec{x}_S$ on the surface of the source 22.

To reconstruct the normal velocity $v_n(\vec{x}_S;\omega)$, we rewrite Eq. (1) as $$\{v_n(\vec{x}_S;\omega)\}_{N\times 1} = [A]_{N\times M}\{\text{Input Data}\}_{M\times 1}, \quad (4)$$

where [A] represents the transfer matrix that correlates {Input Data} to the normal surface velocity $v_n(\vec{x}_S;\omega)$, where $$[A]_{N\times M} = \left[\frac{\partial \Psi(\vec{x}_S;\omega)}{\partial n}\right]_{N\times M}. \quad (5)$$

Next, we use SVD to decompose the transfer matrix [A] in Eq. (4) into $$[A]_{N\times M} = [U]_{N\times M}[\Sigma]_{M\times M}[V]_{M\times M}^H, \quad (6)$$

where [U] and [V] denote the unitary (orthonormal) matrices that contain the left and right singular vectors of the matrix [A], respectively, and $[\Sigma]$ is a diagonal matrix containing the singular values $\epsilon_j$ of [A] with j=1 to N.

As mentioned above, Eq. (4) represents an ill-posed problem since we attempt to reconstruct the cause based on its effect collected by various measurement devices. Accordingly, the transfer matrix [A] is rank deficient. A good way to deal with an ill-posed problem is through regularization. SVD is one of most commonly used regularization techniques in dealing with an inverse acoustic radiation problem.

A rank deficient matrix implies that there are small singular values in the diagonal matrix $[\Sigma]$. Using SVD, we can arrange the matrix $[\Sigma]$ in a descending order so that the smallest singular values are always at the end of the diagonal. Hence by truncating the order of the matrix $[\Sigma]$, we can eliminate the small singular values that may cause distortion in reconstruction. This procedure is called a truncated SVD or TSVD.

However, TSVD is usually insufficient to guarantee a satisfactory reconstruction. A better regularization is to define two functionals $J_1(v_n,v_0^\delta)$ and $J_2(v_n,v_\infty^\delta)$ of the source field $v_n$ between two extreme cases $v_0^\delta$ and $v_\infty^\delta$, where $v_0^\delta$ is an ultra rough least squares solution and $v_\infty^\delta$ represents an ultra smooth solution. Our goal is to strike a balance between the fidelity of a solution to input data described by $J_1(v_n,v_0^\delta)$ and that of solution to some prior information of a source field given by $J_2(v_n,v_\infty^\delta)$. This balance can be obtained by minimizing a cost function:

$$J(v_n^\alpha) = \min_{v\in V}[J_1(v_n, v_0^\delta) + \alpha J_2(v_n, v_\infty^\delta)]. \quad (7)$$

where $v_n^\alpha$ represents the final reconstructed normal surface velocity that depends on a regularization parameter $\alpha$. The choice of regularization parameter $\alpha$ allows users to decide how far to go to achieve certain smoothness. For example, a perfect fidelity to input data may be achieved when $\alpha=0$, whereas a perfect fidelity to a prior source information may be achieved when $\alpha=\infty$.

Equation (7) is the regularization format used in this invention. The regularization parameter $\alpha$ is determined by using generalized cross validation (GCV). The basic concept of GCV is to leave a particular measured data out of calculations of the cost function first, and then evaluate the effectiveness of the reconstructed source field in predicting the value of the omitted data. This process is repeated for all data points and the regularization parameter $\alpha$ obtained can ensure a best fit of the predicted acoustic pressures to all measurements.

The formula for determining the regularization parameter $\alpha$ is given by:

$$\min\left(\frac{\|([I]-[F])[U]^H\{\text{Input Data}\}\|_2^2}{Tr([I]-[F])^2}\right), \quad (8)$$

where the symbol Tr stands for trace of a matrix, [I] in Eq. (8) implies an identity matrix and [F] represents a low-pass filter that eliminates the high wave numbers that may cause distortions in reconstruction, $$[F] = \text{diag}\left(\cdots, \frac{\sigma_j^2(\alpha+\sigma_j^2)^2}{\alpha^3+\sigma_j^2(\alpha+\sigma_j^2)^2}, \cdots\right), \quad (9)$$

where $\sigma_j$ represents the jth singular value of the diagonal matrix $[\Sigma]$.

Using the regularization scheme (7) and GCV (8) for determining a regularization parameter $\alpha$, we can then solve Eq. (4) for the normal surface velocity distribution.

To acquire a better understanding of the structural vibration and sound radiation, we pre-multiply both sides of Eq. (4) by $[U]^H$, $$[U]_{N\times N}^H\{v_n(\vec{x}_S;\omega)\}_{N\times 1} = [\Sigma]_{N\times M}[V]_{M\times M}^H\{\text{Input Data}\}_{M\times 1}. \quad (10)$$

Note that $[U]^H$ and $[V]^H$ in SVD play the role of a Fourier transform, whereas [U] and [U] act like an inverse Fourier transform operator. Therefore, $[U]^H\{v_n\}$ and $[V]^H\{\text{Input Data}\}$ represent the Fourier transform of the normal surface velocity and input data, respectively.

A unique advantage of SVD is that it offers an acoustic modal expansion between the measurement and source fields. The singular vectors are mutually orthogonal and constitute a basis for the measurement and source fields. In this invention, they are called VA modes because they depict the interrelationships between structural vibration and resultant sound radiation. The corresponding singular values independently link the radiating modes to vibration modes. In this context, a large singular value represents a radiating mode and a small singular value indicates a non-radiating mode. Specifically, we have $$[U]^H = \begin{bmatrix} u_{11} & u_{12} & \cdots & u_{1N} \\ u_{21} & u_{22} & \cdots & u_{2N} \\ & & & \\ u_{N1} & u_{N2} & \cdots & u_{NN} \end{bmatrix}. \quad (11)$$

Each row in the unitary matrix $[U]^H$ depicts a VA mode. The relative contribution of each VA mode toward overall structural vibration and sound radiation can be calculated. The sound pressure in a far field can be written as $$\{p(\vec{x};\omega)\} = [\Psi(\vec{x};\omega)][\Psi^H(\vec{x}_{m_2};\omega)\Psi(\vec{x}_{m_2};\omega)]^{-1}\Psi^H(\vec{x}_{m_2};\omega)\{p(\vec{x}_{m_2};\omega)\}, \quad (12)$$

where $\vec{x}$ represents a position vector far from the source.

We can use SVD to write Eq. (12) for each VA mode and estimate sound pressure the contribution from each individual VA mode. Assuming a free field, we can then estimate the sound power from this individual VA mode by integrating the sound pressure over a hypothetical surface $S_0$ that encloses the source.

$$P_{j,av} = \int_{S_0} \int \frac{\langle p_j^2(\vec{x}_{S_0};\omega)\rangle}{\rho_0 c} dS_0, \quad (13)$$

where $P_{j,av}$ represents the time-averaged sound power from the jth VA mode, $p_j$ is the sound pressure produced by the jth VA mode, $\rho_0$ and c stand for the density and the speed of sound of the medium, respectively. In a similar manner, we can calculate the total sound power resulting from the overall sound pressure from this source. The ratio of the sound power from an individual VA mode to the total sound power produced by this source is the efficiency of sound radiation from this individual mode.

$$\eta_j = \int\int_{S_0} \frac{\langle p_j^2(\vec{x}_{S_0};\omega)\rangle_{av}}{\rho_0 c} dS_0 \bigg/ \int\int_{S_0} \frac{\langle p^2(\vec{x}_{S_0};\omega)\rangle_{av}}{\rho_0 c} dS_0. \quad (14)$$

In a similar manner, we define the efficiency of structural vibration for the jth VA mode as the ratio of the vibration energy of this mode to total vibration energy of this structure.

$$\xi_j = \frac{\int\int_{S_0} \langle v_{j,n}^2(\vec{x}_{S_0};\omega)\rangle_{av} dS_0}{\int\int_{S_0} \langle v_n^2(\vec{x}_{S_0};\omega)\rangle_{av} dS_0}. \quad (15)$$

To summarize, we use Eq. (4) together with regularization scheme (7) and GCV (8) to reconstruct the normal surface vibration responses of a target structure. Next, we use (11) to plot each VA mode and use Eqs. (14) and (15) to calculate its efficiencies in terms of vibration and sound radiation. From this efficiency spectrum, we can identify the VA modes that are major contributors to the overall structural vibration and sound radiation. This insight will enable us to device the most cost-effective sound and vibration abatement measures.

Procedures

Noise and vibration have always been a high priority design factor in engineering practice. To eliminate noise and vibration cost effectively, it is necessary to know the mechanism and correlation between sound and vibration of any structure. Oftentimes, however, diagnoses of noise and vibration are done separately, not because of an unawareness of the importance of sound-vibration interrelationships by operators, but because of a lack of effective methodology that can reveal these interrelationships and provide helpful insight into design modifications to eliminate noise and vibration in a cost-effective manner.

The present invention aims at filling this gap by providing an innovative approach to reveal the root causes of sound and vibration and further, offers unique and useful insights into the most cost-effective noise and vibration abatement treatments. The procedures involved in this invention are described as follows.

Consider the case in FIG. 1 where a vehicle transaxle (noise source 22) is driven by an external shaft to run at a desired speed. The vibration of the transaxle 22 produces noise in the surrounding medium. It is desired to acquire a better understand of the interrelationships between sound and vibration of this transaxle so as to reduce them cost effectively.

It is important to understand that sound can be generated by vibrations, but not all vibrations can produce sound. Our goal here is to identify those components of vibrations of any structure that are the major contributors to overall structural vibrations and sound radiation. Then by focusing on these components, we can best achieve our goals of reducing noise and vibration.

The first step of this invention is to collect data. It is emphasized that our goal is to get a better understanding of the root cause of sound and vibration and their interrelationships. Therefore, the more information we can collect about a target machine, the more successful our diagnoses may be. In this context, we would like to collect both velocity and sound information. The velocity information may be measured by using: 1) a scanning laser 25; 2) a P-U probe (not shown); 3) an accelerometer (not shown); etc. The first two are non-invasive; the third requires a direct contact with a target source surface. Sound pressure can be measured by: 1) a microphone 24; 2) a P-U probe (not shown); etc. These measurement devices are all non-invasive. So the present invention allows for an in-situ or non-invasive vibro-acoustic analysis of any complex machine.

Note that sound pressure should be measured at very close range to a target source so as to capture the near-field effects that are critical in describing the structural vibration. These near-field sound pressures may be measured using an array of microphones 24, or using a paddle of microphones 24 moving around a target source, or using a P-U probe scanning over a source surface at very close range. If the vibration and sound signals are stationary, namely, the frequency does not change over time, we can collect data separately and take time averages to get the root-mean-squared values of velocity and sound pressure. If vibration and sound signals are non-stationary, for example, during run-up or run-down of a transaxle, we must take velocity and sound pressure measurements all at once.

Once the velocity and sound pressure data are collected, we substitute them in Eq. (4) together with Eqs. (7) and (8) to reconstruct the normal component of velocity on the surface of a target source. This represents the overall vibration response on the surface.

Next, we use Eq. (12) to reconstruct the sound pressure at any field point.

To understand the interrelationship between sound and vibration, we use Eq. (11) via SVD or other mathematical tools to decompose the overall surface vibration into a set of VA modes that are linearly independent and mutually orthogonal. This orthogonality guarantees that a superposition of the VA modes will produce a convergent result.

In a similar manner, we use Eq. (12) to calculate the sound pressures of individual VA modes and Eq. (14) to estimate the efficiencies of all VA modes to overall sound radiation.

The efficiencies of all VA modes to the overall structural vibration are estimated by using Eq. (15).

The efficiencies of individual VA modes will reveal the major contributors of VA modes toward overall structural vibrations and sound radiation. These results may provide useful insight into design modifications to noise and vibration abatement. For example, suppose that the $2^{nd}$ VA mode is the major contributor to sound, while the $4^{th}$ VA mode the major contributor to structural vibration. Then depending on our need to suppress sound or vibration or both, we may modify the design of this structure by focusing on the $2^{nd}$ or $4^{th}$ or both VA modes. Usually it is much easier to suppress a particular mode than to suppress the overall structural vibration. Hence this invention can lead to an optimal design change to best cope with noise and vibration issues.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers in method steps are for ease of reference in dependent claims and unless otherwise specified do not indicate a required sequence.

What is claimed is:

1. A noise diagnostic system comprising:
   a plurality of first transducers for measuring acoustic pressure in a sound field near a noise source;
   at least one second transducer for measuring normal surface velocity on the noise source; and
   a computer acquiring acoustic pressure data from the plurality of first transducers and normal surface velocity data from the at least one second transducer, the computer generating a transfer matrix representing a correlation between normal surface velocity on the noise source and the acoustic pressure in the sound field, wherein the computer is programmed to decompose the transfer matrix into a plurality of vibro-acoustic modes.

2. The system of claim 1 wherein the computer is programmed to decompose the transfer matrix into a plurality of forced vibro-acoustic modes.

3. The system of claim 2 wherein the vibro-acoustic modes are linearly independent and mutually orthogonal.

4. The system of claim 2 wherein the computer is programmed to calculate sound pressures for individual vibro-acoustic modes of the plurality of vibro-acoustic modes.

5. The system of claim 4 wherein the computer is programmed to estimate the efficiencies of the plurality of vibro-acoustic modes.

6. A method for diagnosing a noise source including the steps of:
   a) determining acoustic pressure in a sound field near a noise source;
   b) determining acoustic pressure on a surface of the noise sources;
   c) determining normal surface velocity on a surface of the noise source;
   d) generating a transfer matrix representing a correlation between the normal surface velocity on the surface of the noise source and the acoustic pressure in the sound field; and
   e) decomposing the transfer matrix into a plurality of vibro-acoustic modes.

7. The method of claim 6 wherein said step a) includes the step of measuring acoustic pressure in the sound field.

8. The method of claim 7 wherein said step a) further includes the step of measuring acoustic pressure with a plurality of microphones.

9. The method of claim 6 wherein said step b) includes the step of measuring the normal surface velocity on the surface of the noise surface.

10. The method of claim 6 wherein said step b) further includes measuring the normal surface velocity with at least one laser.

11. The method of claim 6 wherein said steps a) and b) are performed based upon information from a P-U probe.

12. The method of claim 6 wherein said step e) further includes the step of:
   decomposing the transfer matrix into a plurality of forced vibro-acoustic modes.

13. The method of claim 6 wherein the vibro-acoustic modes are linearly independent and mutually orthogonal.

14. The method of claim 6 further including the step of:
   f) calculating sound pressures for individual vibro-acoustic modes of the plurality of vibro-acoustic modes.

15. The method of claim 14 further including the step of:
   g) estimating the efficiencies of the plurality of vibro-acoustic modes.

16. The system of claim 1 wherein the computer is programmed to calculate sound pressures for individual vibro-acoustic modes of the plurality of vibro-acoustic modes.

17. The system of claim 16 wherein the computer is programmed to estimate the efficiencies of the plurality of vibro-acoustic modes.

* * * * *